United States Patent [19]

Kaplan et al.

[11] Patent Number: 4,493,524
[45] Date of Patent: Jan. 15, 1985

[54] FACTORY DATA COLLECTION TERMINAL CONDUIT ENCLOSURE

[75] Inventors: Jay Kaplan, Wayland; Ray Marchant, Westboro, both of Mass.

[73] Assignee: Honeywell Information Systems Inc., Waltham, Mass.

[21] Appl. No.: 277,784

[22] Filed: Jun. 26, 1981

[51] Int. Cl.³ .......................... G06F 1/00; H01R 13/60
[52] U.S. Cl. .................................. 339/125 R; 364/708
[58] Field of Search ............... 364/708; 200/5 R, 5 A; 339/121, 125 R, 137, 138, 119 R

[56] References Cited

U.S. PATENT DOCUMENTS

| | | |
|---|---|---|
| 3,627,935 | 12/1971 | Spievak .......................... 200/5 A X |
| 4,178,060 | 12/1979 | Coffey ............................. 339/125 R |
| 4,379,336 | 4/1983 | Yamamoto et al. ................. 364/708 |

FOREIGN PATENT DOCUMENTS

2279305  2/1976  France ........................... 339/125 R

Primary Examiner—A. T. Grimley
Assistant Examiner—D. A. Tone
Attorney, Agent, or Firm—George Grayson; Nicholas Prasinos

[57] ABSTRACT

In a computer factory data collection terminal an electrical conduit enclosure for permitting wiring to be brought up through the conduit to the factory data collection terminal and for providing full wiring protection while still permitting the terminal to be installed or detached without opening the unit. A conduit enclosure having a base, cover, conduit fittings and special data and address signal connector and power connections is detachably mounted below the data collection terminal.

4 Claims, 10 Drawing Figures

| PINS | NAME | FUNCTION |
|---|---|---|
| 1 | FG | FRAME GROUND |
| 2 | TD | TRANSMITTED DATA |
| 3 | RD | RECEIVED DATA |
| 4 | RTS | REQUEST TO SEND |
| 5 | CTS | CLEAR TO SEND |
| 6 | NOT CURRENTLY USED | |
| 7 | SG | SIGNAL GROUND |
| 8 | DCD | DATA CARRIER DETECT |
| 9 | NOT CURRENTLY USED | |
| 10 | NOT CURRENTLY USED | |
| 11 | NOT CURRENTLY USED | |
| 12 | NOT CURRENTLY USED | |
| 13 | GND | GROUND USED FOR ADDRESS & BAUD SELECTION |
| 14 | SWCOM | SWITCH DISABLE |
| 15 | +5V | SWITCH DISABLE |
| 16 | NOT CURRENTLY USED | |
| 17 | NOT CURRENTLY USED | |
| 18 | NOT CURRENTLY USED | |
| 19 | RB | REMOTE BAUD SELECTION |
| 20 | DTR | DATA TERMINAL READY |
| 21 | RAB1 | REMOTE ADDRESS BIT 1 |
| 22 | RAB2 | REMOTE ADDRESS BIT 2 |
| 23 | RAB3 | REMOTE ADDRESS BIT 3 |
| 24 | RAB4 | REMOTE ADDRESS BIT 4 |
| 25 | NOT CURRENTLY USED | |

FIG. 7

| WIRE NO. | FROM CONNECTOR NO. | FROM PIN NO. | TO | TO PIN NO. |
|---|---|---|---|---|
| 1 | J1 | 8 | PIN | 4 |
| 2 | ↑ | 20 | ↑ | 5 |
| 3 |  | 5 |  | 6 |
| 4 |  | 4 |  | 7 |
| 5 |  | 3 |  | 9 |
| 6 |  | 7 |  | 10 |
| 7 |  | 2 | ↓ | 11 |
| 8 |  | 1 | PIN | 12 |
|  |  |  | CONNECTOR NO. | PIN NO. |
| 9 |  | 15 | P16 | 1 |
| 10 |  | 14 | ↑ | 2 |
| 11 |  | 13 |  | 4 |
| 12 |  | 19 |  | 5 |
| 13 |  | 24 |  | 6 |
| 14 |  | 23 |  | 7 |
| 15 | ↓ | 22 | ↓ | 8 |
| 16 | J1 | 21 | P16 | 9 |

*FIG. 8*

| ADDRESS* | JUMPER PIN 13 TO PIN: | | | |
| --- | --- | --- | --- | --- |
| | 21 | 22 | 23 | 24 |
| 1 | X | | | |
| 2 | | X | | |
| 3 | X | X | | |
| 4 | | | X | |
| 5 | X | | X | |
| 6 | | X | X | |
| 7 | X | X | X | |
| 8 | | | | X |
| 9 | X | | | X |
| A | | X | | X |
| B | X | X | | X |
| C | | | X | X |
| D | X | | X | X |
| E | | X | X | X |
| F | X | X | X | X |

*ADDRESS "0" NOT VALID

FACTORY DATA COLLECTION TERMINAL CONDUIT ENCLOSURE

U.S. PATENTS INCORPORATED HEREIN BY REFERENCE

Apparatus for Processing Data Transfer Requests in a Data Processing System, issued Nov. 23, 1976 with U.S. Pat. No. 3,993,981 by Frank V. Cassarino, Jr. et al. and assigned to the same assignee.

BACKGROUND OF THE INVENTION

1. Field of the Invention

This invention relates to computer terminal apparatus, and more particularly to the factory data collection terminal.

2. Description of the Prior Art

Factory data collection terminals are generally installed in factory areas for use of personnel to enter information pertaining to the operation of the factory. For example, they may be placed in unattended areas in the factory for use of production workers in recording the starting or stopping of a job. They can be utilized for inventory control, or provide the database for payroll calculations. Generally the areas in which such factory data collection terminals are located are quite dirty as compared to office areas, banking operations, and other similar type of commercial operations. Accordingly such data collection terminals are enclosed in dustproof packages.

Figure 1:
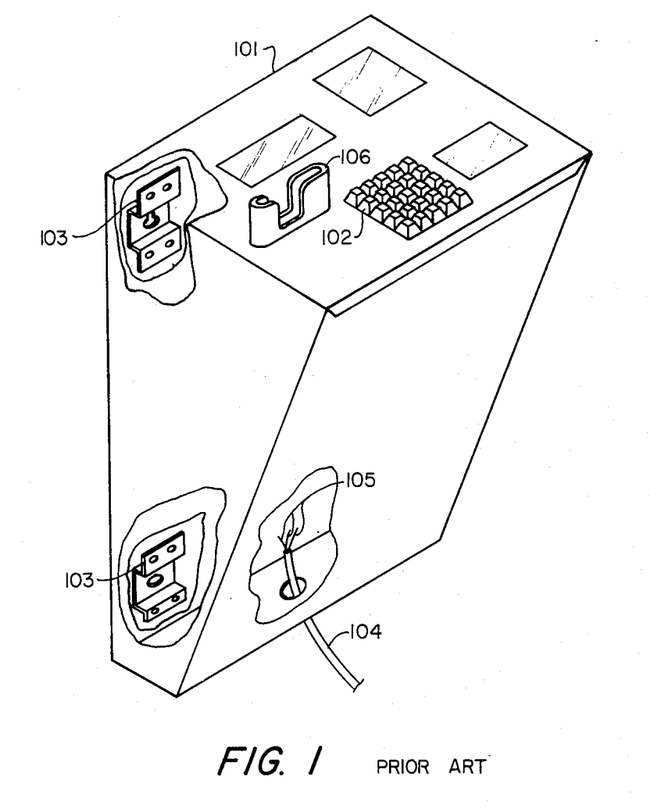
FIG. 1 is a prior art, three-dimensional view of a factory data collection terminal.

A typical prior art unit is shown on FIG. 1. A dustproof enclosure 101 protects the internal mechanism from dirt, dust, grease and other harmful contaminants in the atmosphere. The unit is designed to be mounted against a wall or post via mounting brackets 103. Information may be entered into the unit via keyboard switches 102 or via card reader slot 106. Power, data signals and address signals are provided to the unit via a conduit 104 encasing wires 105, as shown in the cutaway of FIG. 1. Many such units may be placed at various locations in the factory. They are all interconnected, generally into a main computer system which is remotely located. Each unit can provide information for storage or processing by the computer system. In order to identify the source of information, each factory data collection unit has an address by which it is identified. Each data collection unit also has its own baud rate for transmitting information to the central processing system or receiving information from it. The baud rate of one unit may be different from another unit. A problem arises when maintenance is required of any of these data collection units. By removing the enclosure 101 in order to diagnose and correct a problem, the internal mechanism is exposed to contaminants and untrained maintenance personnel which can cause other more severe problems. Accordingly, it is desirable to remove the entire factory data collection unit without exposing any of the internal mechanism and replace it with another operable unit. The inoperable unit would then be sent to a central maintenance depot, repaired and returned. Under the prior art arrangements, it was not possible to remove the entire unit without in some manner exposing the internal mechanism to the factory contaminants.

What was required was a special enclosure housing all the various connecting circuits which could be removably attached to the factory data collection terminal, and which could be opened to the factory atmosphere to permit the removal of the data collection sealed terminal. After removal of the inoperable data collection terminal, what was further required was to have it replaced with an operable one until the original data terminal was repaired at a centrally located maintenance depot and returned, again without exposing the internal operating mechanisms of the data terminal. What was further required was to retain the same identification address for the special connector as the inoperable terminal. Since each data collection terminal has its own identification address, it was necessary to have the address of the replacement unit disabled via means located in the connector and to set the address of the disabled terminal again by means located in the connector so that any other unit in the system addressing the new terminal utilizing the old address would be able to communicate with the new terminal as if it were the old terminal.

Another problem in replacing an inoperable terminal with an operable one was that the baud rate of sending signals may be different than for the terminal replaced. Accordingly, another requirement of an improved connector was a means in the connector for selecting different baud rates.

OBJECTS OF THE INVENTION

It is a primary object of the invention to provide an improved data collection terminal.

It is another primary object of the invention to provide an improved data collection terminal electrical enclosure which would permit the removal and replacement of the data collection terminal without exposing the internal mechanism of such data collection terminal to the atmosphere and yet retain a conduit interface.

It is another object of the invention to provide an improved data collection terminal electrical enclosure housing.

SUMMARY OF THE INVENTION

In accordance with the above and other objects of the invention, a conduit enclosure having a base, cover, conduit fittings and special data and address signal connector and power connection terminal board is removably attached below a factory data collection terminal. All wiring is attached to the terminal via the connectors, and permits all terminals connected via the connectors to be of the non-conduit version. Installation and removal of the terminal without exposing the internal wiring and mechanism of the terminal to contaminants present in the atmosphere is also easily accomplished.

DESCRIPTION OF THE PREFERRED EMBODIMENT OF THE INVENTION

Referring now to FIG. 1, there is shown a prior art factory data collection terminal. An integral enclosure 101 houses the electronic circuits and other mechanisms for the factory data collection terminal. The data collection terminal is designed to be mounted on a wall or post via mounting brackets 103. Power, data signals and address signals are provided via wires 105 which are housed in a conduit 104 directly connected to the enclosure of a factory collection terminal. It should be noted that in order to mount the unit on the wall it is necessary to remove the enclosure, thus exposing the internal wiring mechanisms to any contaminants that may be present in the atmosphere and untrained personnel.

Figure 2:
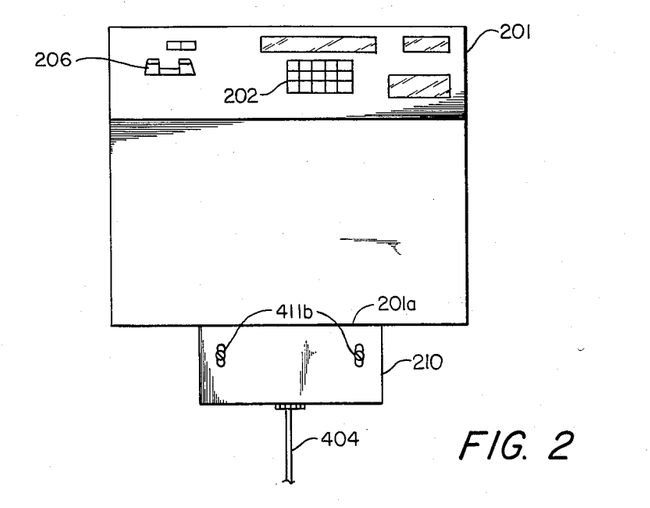
FIG. 2 is a front elevation view of the invention.
Figure 3:
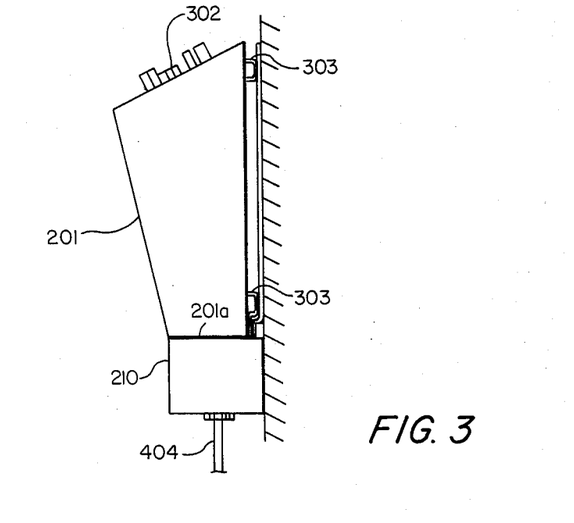
FIG. 3 is a side elevation view of the invention.
Figure 4:
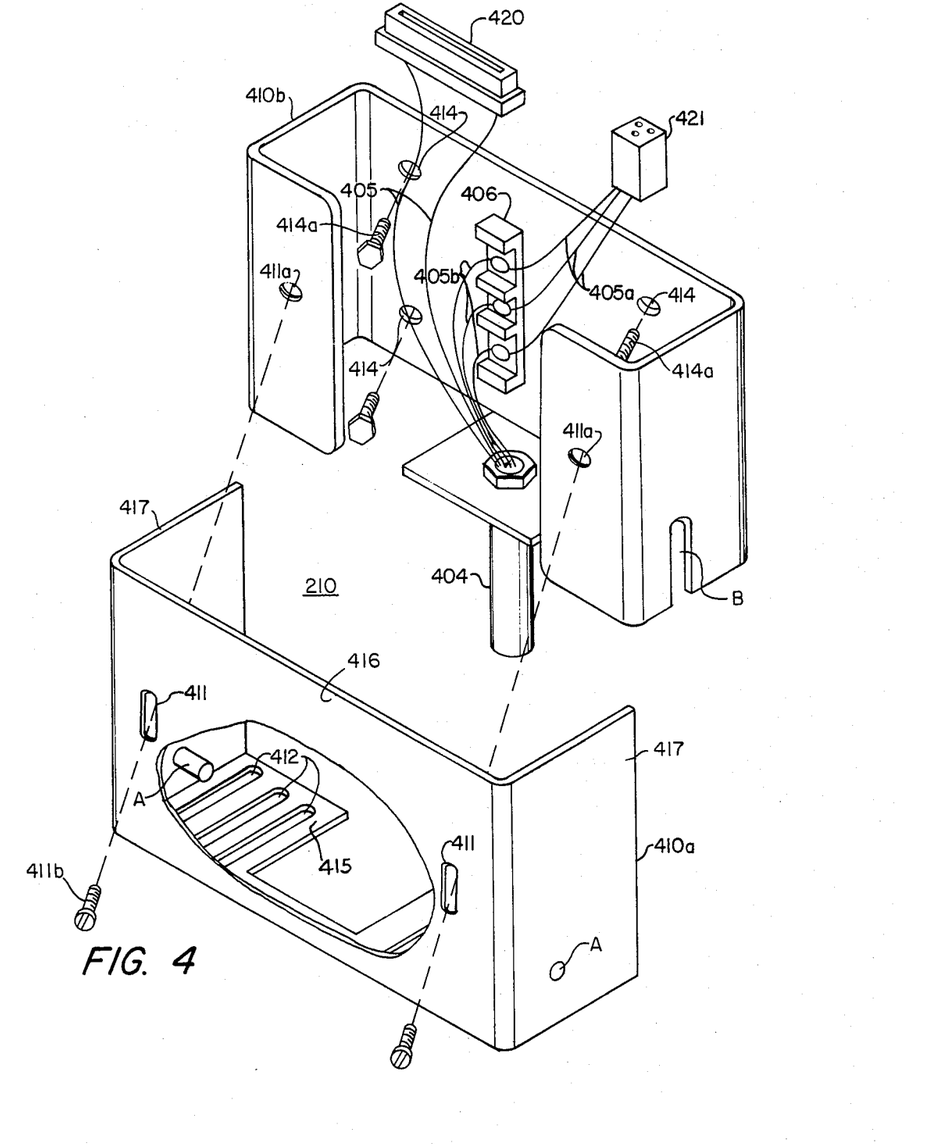
FIG. 4 is an exploded view of the factory data collection terminal electrical conduit enclosure.

Referring now to FIGS. 2, 3 and 4, there is shown the invention wherein a special electrical enclosure unit 210 is removably attached below the factory data collection terminal 201. Power is provided to the data collection terminal via wires 405a and 405b, utilizing terminal board 406 and power plug 421. Computer system bus data signals and address signals are provided to the data collection terminal via wires 405 and electric plug 420. These incoming power and signal wires are housed in a conduit 404, which is removably connected to the electrical connector unit 210. To prevent interference between signals, the wires are shielded by standard shielding means. The power plug 421 and the data and address signal plug 420 are removably connected to the surface 201a of data collection terminal unit 201. It will be noted that a removable face plate 410a of enclosure unit 210 has air vents 412 in its base 415 for ventilation of the connector unit. The back plate 410b has mounting holes 414 so that the back plate unit 410b can be permanently mounted to a wall or post via bolts 414a. The face plate unit 410a has a front wall 416 and side walls 417 which extend back to about the wall to which the back plate is mounted. The face plate unit is attached to the back plate unit via screws 411b passing through slotted holes 411 and screwing into tapped holes 411A. Pins A in slots B position back plate 410b relative to face plate 410a. This allows the face plate 410a to have vertical adjustment and prevent unauthorized access to wiring by sliding up to touch the bottom of the terminal. Thus all the internal connecting mechanisms and circuits can be opened for connecting or disconnecting the data collection terminal via the connecting circuitry. However, in connecting or disconnecting the data collection terminal through the electrical enclosure unit 410, it is not necessary to open and expose any of the interior mechanisms of the data collection terminal. The data collection terminal can be mounted or dismounted via the mounting brackets 303 external to the data collection unit.

Figures 5, 6:
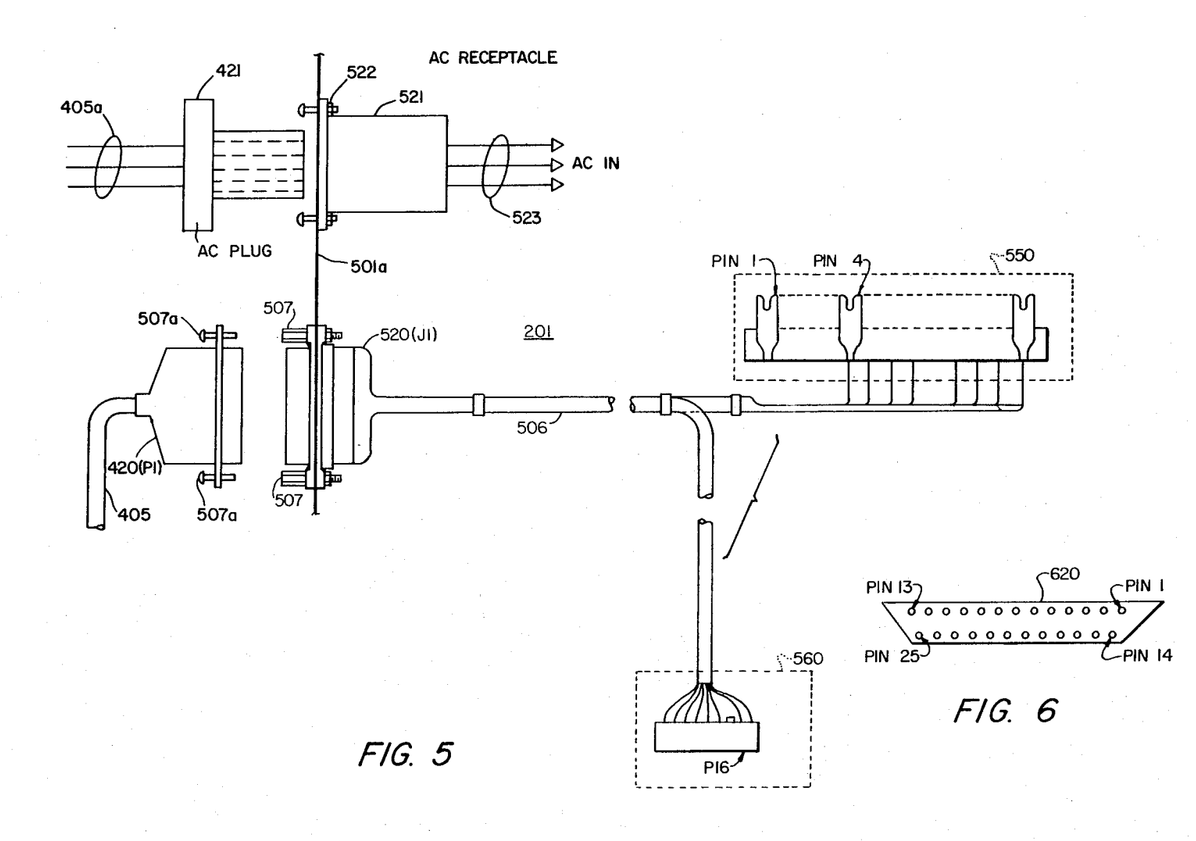
FIG. 5 is a schematic diagram of the wiring of the invention located within the data collection terminal.
FIG. 6 is a schematic of the pin arrangement and numbering in the external communication connector.

Referring now to FIG. 5, the connector J1 520 is mounted from the inside of the data collection terminal 201 on bottom surface 201a by bolts 507. (The external portion of the data collection terminal 201 is shown on FIGS. 2 and 3.) An internal cable 506 from connector J1 520 includes wires which lead to pin assembly 550 and also lead to connector P16 in connector terminal assembly 560. An external connector P1 420 places into and is attached to the connector J1 520 via screws 507a. A power plug 521 is fastened to bottom surface 201a via nut and bolt assembly 522. Power plug 421 plugs into power plug 521 to provide AC power to terminal 201 via power leads 523.

The address and data lines terminate in connector 420 of FIG. 6. It should be noted that the pins in connector 420 are shown in plan view and are numbered from pin 1 through pin 13 on the top row and from pin 14 to pin 25 on the bottom row.

Figure 8:
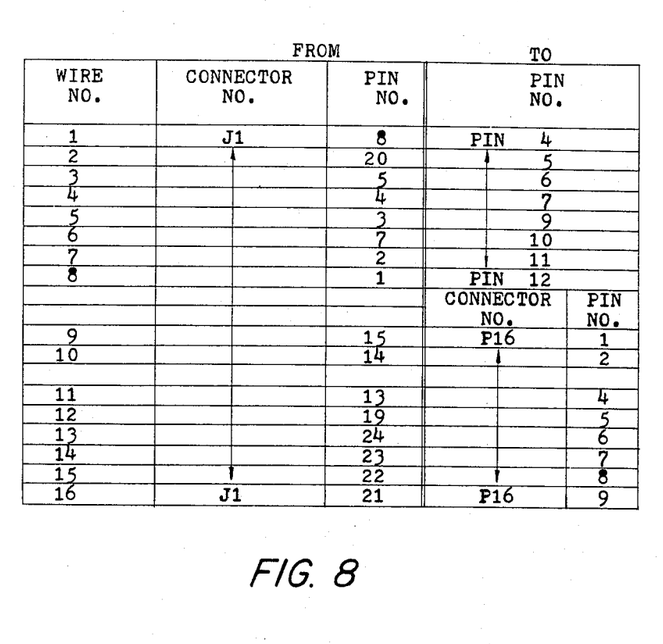
FIG. 8 identifies the wire number and the connector and pin numbers associated with each wire internally and externally to the data collection terminal.

Referring to FIG. 8, there is shown various columns identified as wire number, connector number and pin number. For example, wire number 1 has one end attached to pin number 8 of connector J1, and the other end attached to pin 4 in pin assembly 550. Similarly wire number 9 has one end coupled to pin number 15 of connector J1, while the other end is coupled to pin number 1 (not shown) of connector P16. Utilizing this example, the remaining wires can similarly be traced.

Figure 7:
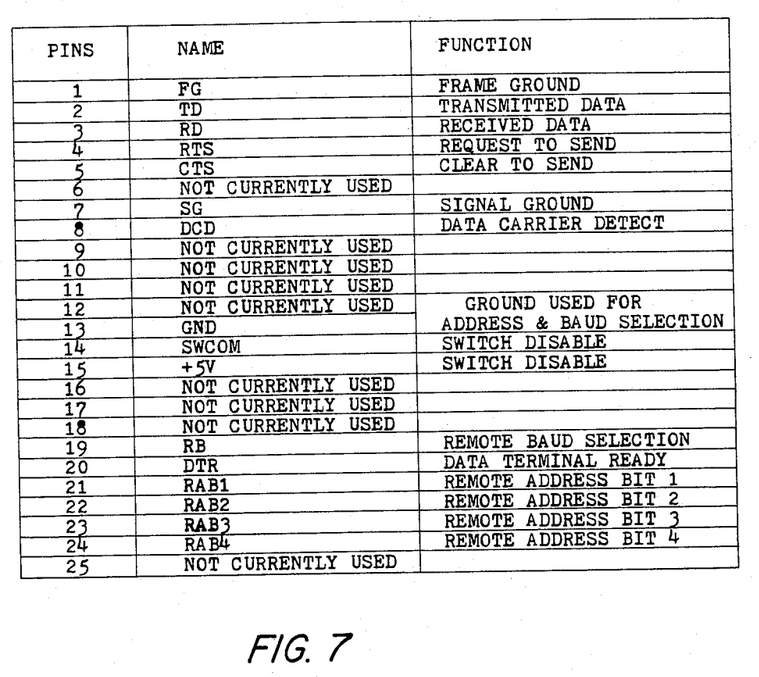
FIG. 7 identifies the pins shown in FIG. 6 and their function.

Referring now to FIG. 7, various pins of terminal cable connection 420 are identified by name and function. For example, pin number 1 is the FG or frame ground pin, whereas pin number 8 is the DCD or data carrier detect pin.

Figure 10:
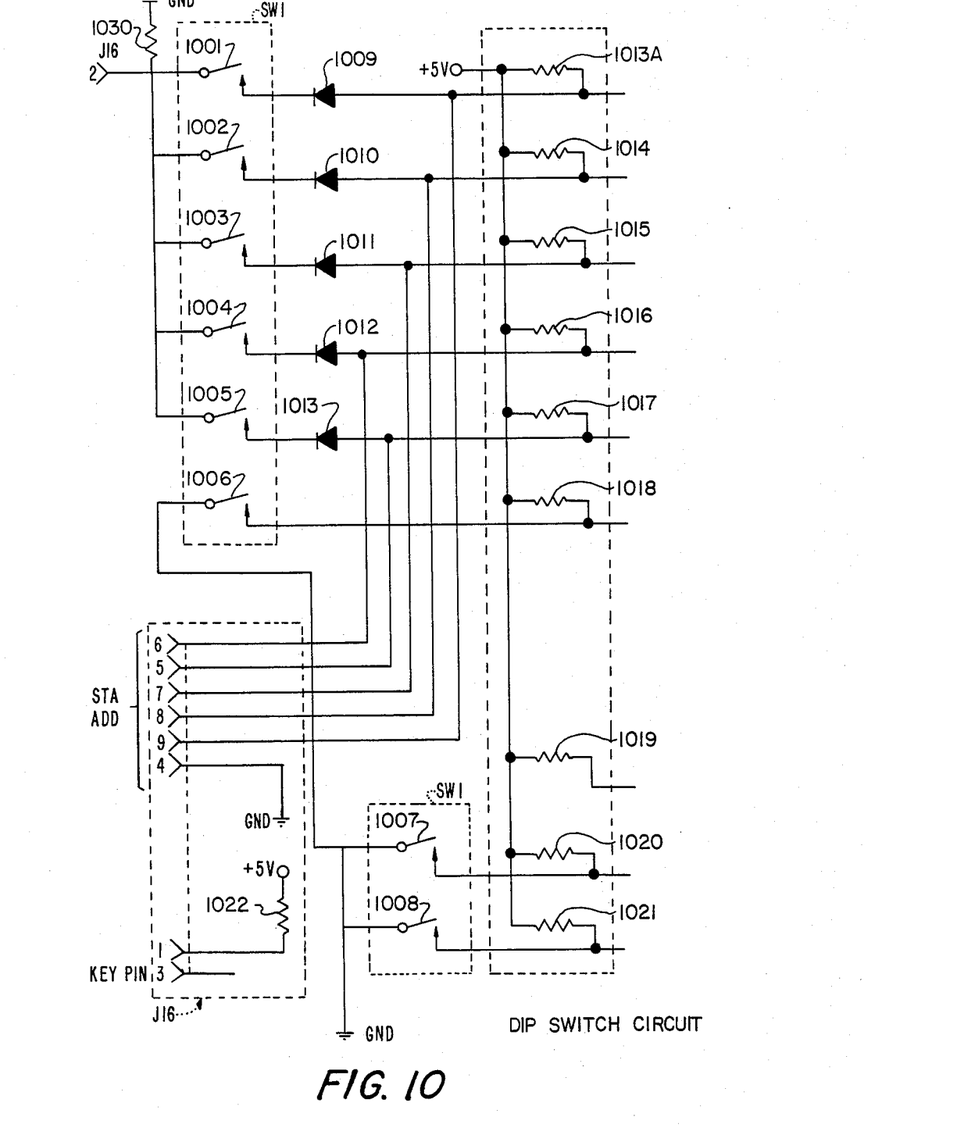
FIG. 10 is a schematic diagram showing the DIP switches within the factory data collection terminal.

In addition to the circuitry shown on FIG. 5 which is internal to the factory data collection terminal, there are also the DIP switches (Dual In-Line Package) shown on FIG. 10 which are also internal to the factory data collection terminal. Referring to FIG. 10, there is shown the DIP switch SW1 which comprises switches 1001 through 1008. One terminal each of switches 1001 through 1005 is coupled to pin 2 in connector J16 and to ground through resistor 1030. The other terminal of switch 1001 is coupled to diode 1009, and each switch 1002 through 1005 being similarly coupled to a respective diode 1010–1013. Additionally, diodes 1009 through 1012 are coupled to resistors 1013 through 1017, respectively. One terminal of switches 1006 through 1008 are additionally coupled to ground. The other terminal of switches 1006, 1007 and 1008, respectively, are coupled to resistors 1018, 1020 and 1021. Switch 1001 is coupled to pin 9 of connector J16; switch 1002 is coupled to pin 8 of connector J16. Pin 1003 is coupled to pin 7 of connector J16. Switch 1004 is coupled to pin 6 of connector J16; switch 1005 is coupled to pin 5 of connector J16. Pin 1 is coupled to a 5 volt supply through resistor 1022; whereas pin 4 is coupled to ground. Pin 3 is a keying pin (no connection); i.e., the pin is cut off and the mating connector socket filled so as to ensure that the mating connector is installed correctly (common practice). It should be noted that connector J16 mates with connector P16 shown on FIG. 5.

The address of any data collection terminal is set internally via opening or closing switches. When the switch is closed, this can represent a binary 1; whereas when the switch is opened, it can represent a binary 0.

For example, assuming that the factory data collection terminal has address 7. According to the convention adopted, this would be represented internally by setting switches 1001, 1003 and 1002 to a closed position and leaving switch 1004 open. This gives binary 0111 equal to decimal 7.

Figure 9:
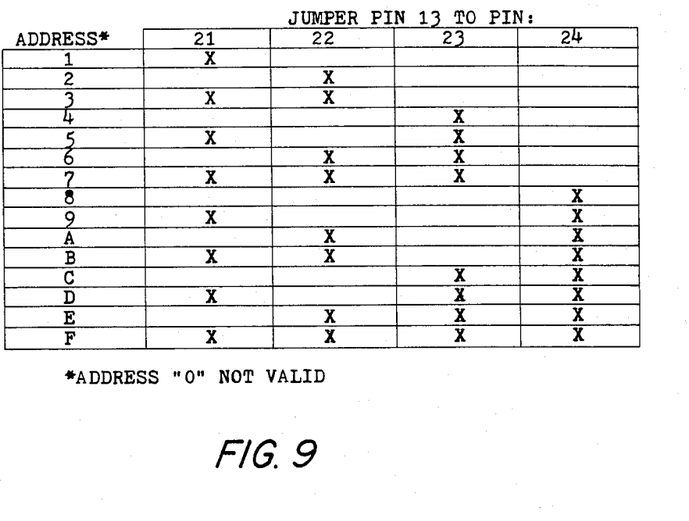
FIG. 9 is a diagram showing the jumpering of various wires in the electrical communications connector to address a unit via means external to the data collection terminal.

Assuming further that this unit is removed and replaced by another unit which has been set with a different address, it is necessary that this replacement unit have the same old address number 7. This can be accomplished externally by jumpering wires shown in connector 420 on FIGS. 4, 5 and 6. This jumpering is accomplished in accordance with FIG. 9. FIG. 9 provides addresses by jumpering pin 13 to a combination of pins 21, 22, 23 or 24 as shown in FIG. 9. First, however, the address and baud rate DIP switches inside the replacement unit must be disabled. This is accomplished by jumpering pin 14 to 15. In order to change address then, pin 13 is jumped to some combination of pins 21, 22, 23 or 24. For example, in order to obtain address 7, pin 13 is jumped to pins 21, 22 and 23.

The baud rate can also be changed by jumpering pins. This is accomplished as follows. In order to obtain a 1200 baud rate, pin 13 is jumped to pin 19. In order to obtain a 2400 baud rate, no jumper is necessary.

It should be noted, therefore, that both addresses and baud rate changes can be made externally to any unit attached to the electrical connector unit.

Having shown and described one embodiment of the invention, those skilled in the art will realize that many variations and modifications can be made to produce the described invention and still be within the spirit and scope of the claimed invention. It is the intent therefore, that the invention be limited only as indicated by the scope of the claims.

What is claimed is:

1. In a computer system comprising at least a data collection terminal, a central processing unit (CPU) and a bus having data and address lines between said CPU and said data collection terminal, said data collection terminal comprising:
   (1) a conduit enclosure portion including,
      (a) a back plate;
      (b) a face plate unit having a front wall and opposing side walls and fastening means for fastening the face plate unit to said back plate unit to form a box-like enclosure with said back plate unit the fastening means allowing for sliding of the face plate unit relative to the back plate unit in a direction parallel to the front wall and side walls;
      (c) a first signal plug means for coupling with said data and address lines; and
      (d) mounting means incorporated in said back plate unit for mounting said conduit enclosure portion to a wall;
   (2) a data collection portion including,
      (a) second signal plug means attached to a bottom surface of said data collection portion for removable coupling with said first signal plug means for receiving said data and address lines; and
      (b) bracket means for removably attaching said data collection portion to said wall.

2. The computer system as recited in claim 1 wherein said conduit enclosure portion includes first power plug means coupled to a terminal board and wherein said data collection portion includes second power plug means removably attached to said bottom surface, said first power plug means being coupled to said second power plug means for providing power to said data collection portion.

3. The computer system as recited in claim 2 wherein said conduit enclosure portion includes air vent means in said face plate for permitting air within said conduit enclosure portion.

4. The computer system as recited in claim 3 wherein said conduit enclosure portion includes shielding means for preventing signal interference between lines.

* * * * *